3,570,128
DENTAL MILLING AND SURVEY TOOL
Ralph Irizarry, 232 Newman St.,
Brentwood, N.Y. 11717
Filed Nov. 4, 1968, Ser. No. 773,240
Int. Cl. A61c *11/00*
U.S. Cl. 32—40         7 Claims

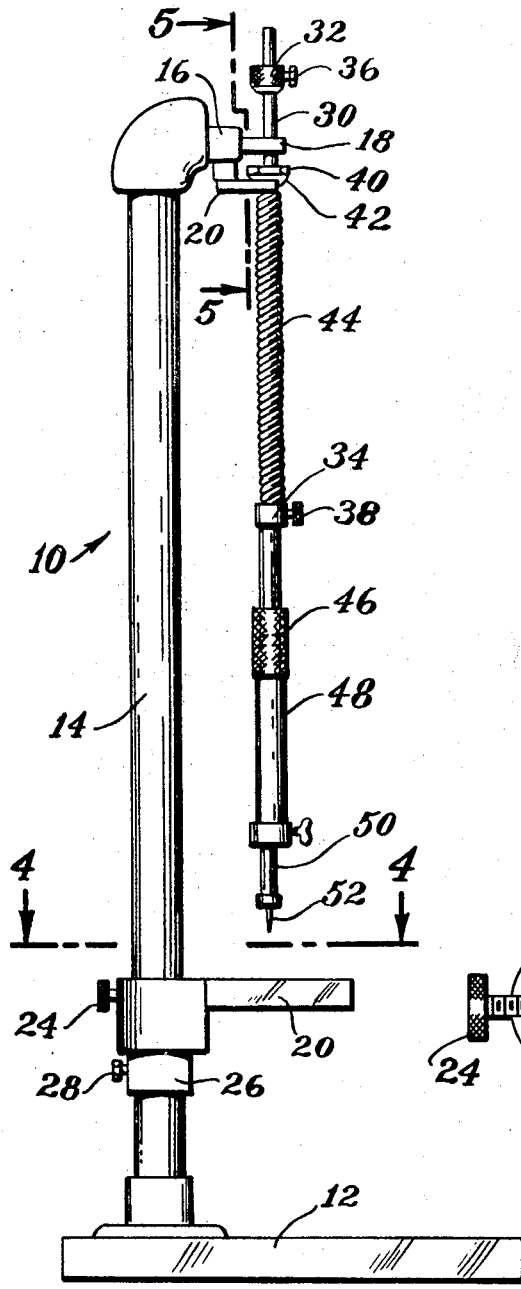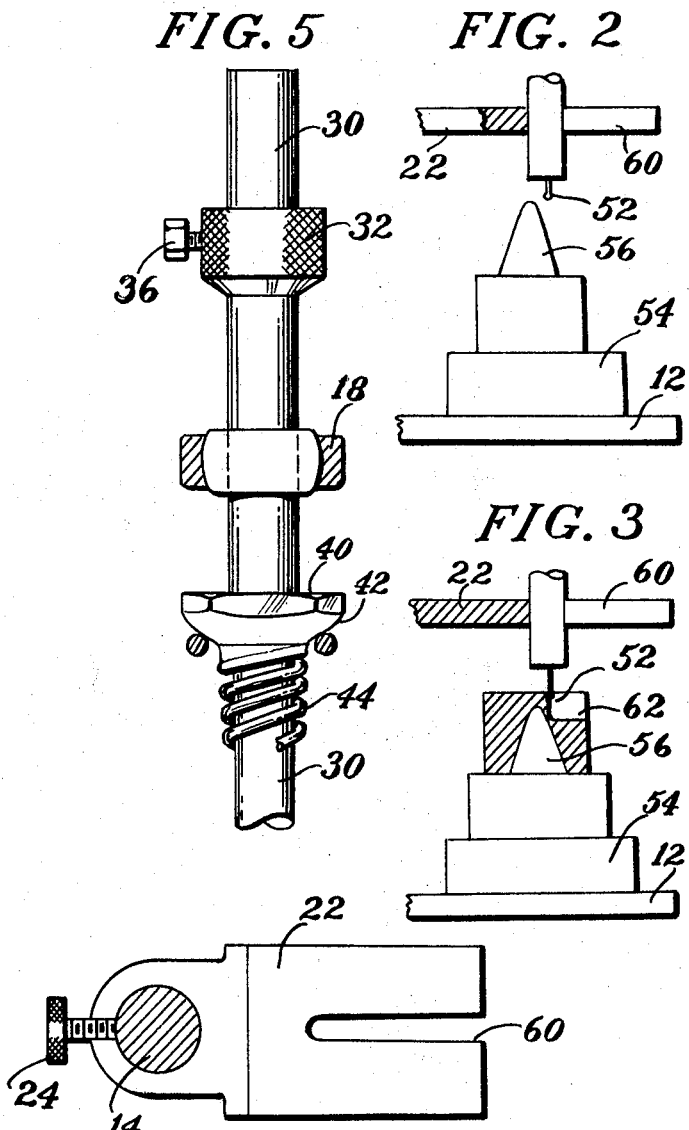
FIG. 1  FIG. 2  FIG. 3  FIG. 4  FIG. 5  FIG. 6
RALPH IRIZARRY
INVENTOR.
BY Leonard H. King
ATTORNEY United States Patent Office 3,570,128
Patented Mar. 16, 1971

ABSTRACT OF THE DISCLOSURE

A guide is provided to permit a dental tool to make a bi-directional cut in the crown of a tooth and survey a dental cast.

This invention relates generally to dental tools and more particularly to an accessory for accurately guiding and limiting the cut made by a dental tool and for surveying dental cast and models.

BACKGROUND OF THE INVENTION

As is well known, plates or bridges are used to replace missing teeth. When the plates or bridges are only partial, existing teeth are used to provide the anchoring places for the new dentures. However, it is necessary to add a crown to the teeth that provide the anchoring positions. The crown is slotted to receive the connecting member of the plate or bridge. Since the crown must be permanently attached to the tooth it is essential that the slots formed in the crown do not extend completely therethrough and expose a portion of the tooth which has been ground to receive the crown. In other words the slot must not be greater in depth than the wall thickness of the crown so that the tooth underneath will not be subject to decay due to exposure..

Accordingly, it is an object of this invention to provide an improved accessory for guiding a dental cutting tool.

It is another object of this invention to provide an improved dental tool guide that permits the cutting of a limited depth slot in a tooth crown.

A more particular object of this invention is to provide an improved dental tooth guide that permits the cutting of a slot in a tooth crown, the slot extending in two different directions and being of accurately controlled depth.

It is another feature of this invention to permit the survey of a dental cast.

These and other features, advantages and objects of the invention will, in part, be pointed out with particularity and will, in part, become more obvious from the following more detailed description of the invention, taken in conjunction with the accompanying drawing which forms an integral part thereof.

In the various views, like reference characters designate like parts.

DESCRIPTION OF THE DRAWING

FIG. 1 is an elevational view illustrating the construction of this invention;

FIG. 2 is a fragmentary elevational view, partially in section, illustrating one step in slotting a tooth crown wherein the present invention is used;

FIG. 3 is another fragmentary elevational view, partially in section, illustrating a subsequent step that is performed when slotting a tooth crown by means of the present invention;

FIG. 4 is a sectional plan view taken along line 4—4 of FIG. 1;

FIG. 5 is an enlarged fragmentary elevational view taken along line 5—5 of FIG. 1; and FIG. 6 is a schematic plan view of a typical tooth crown having a bi-directional slot formed therein by apparatus comprising the present invention.

The apparatus of this invention will be described first and then the mode of operation of the apparatus will be discussed. However, before doing so several of the terms that are used hereinafter will be defined. As mentioned above the present invention provides a bi-directional cut in a tooth crown. The first cut extends from the outer surface of the tooth crown and will be referred to as the radial cut because it is directed generally towards the center of the tooth. The second cut is generally perpendicular to the radial cut and will be referred to, for purposes of this description, as the transverse cut although this is not completely accurate. Actually, as will be explained later, the transverse cut is slightly arcuate but the radius, as compared with the length of the transverse cut, makes the arc negligible.

Turning now to FIG. 1, there is shown the present invention 10 comprising a base member 12 having a support member 14 extending upwardly therefrom. At the upper end of the support member 14 there is provided an outwardly extending arm 16 that includes a universal joint such as a spherical bearing 18. A pair of parallel, spaced apart support rods 20 are also suitably secured to the arm 16 and extend outwardly therefrom for a purpose to be described later. Proximate the lower end of the support member 14 and adjacent the base member 12 there is provided a vertically adjustable and pivotally movable guide member 22 that may be secured to the support member 14 by means of a screw 24 when its relative height is established and when the radial cut is to be made. A collar 26 is positioned below the guide member 22 and is secured to the support member 14 by means of a screw 28. The collar 26 serves to provide support for the guide member 22.

A shaft 30 extends through the spherical bearing 18 and includes upper and lower stop collars 32 and 34, respectively, that are secured to the shaft 30 by means of screws 36 and 38, respectively. A semi-spherical shoulder 40 is attached to the shaft 30 below the bearing 18 such that the spherical surface portion 42 thereof rests on the rods 20 as shown in FIG. 5. An elongated compression spring 44 is positioned about the shaft 30 and extends between the spherical surface 42 and the lower stop collar 34 so that during operation the shaft may be moved vertically. The portion of the shaft 30 below the lower stop collar 34 is threaded to receive a knurled coupling sleeve 46 that is intended to permit limited axial adjustment of the cutting tool. A collet 48 is also secured to the coupling sleeve 46 to receive a conventional air tool 50 and a cutting tool such as a burr 52 or a surveying tool when this invention is used for that purpose.

The manner in which the present invention is used will now be described in conjunction with FIGS. 2 and 3. A holder 54 is positioned on the base member 12 and supports an exact model 56 of the reworked tooth that is to receive the crown 58 (FIG. 6). The position of the holder is adjusted so that the burr 52 does not touch the tooth model 56 when the air tool is positioned at the base of a slot 60 formed in the guide member 22. Shims or a feeler gauge can be used to establish the precise spacing between the burr 52 and the tooth model 56. The crown 58 is then placed on the tooth model 56 and the burr is moved through the slot 60 formed in the guide member 22. This movement cuts the radial slot 62 in the crown. This action is generally referred to as "milling." It should be noted that the lower portion of shaft 30 containing the burr 52 rocks in a pendulum-like manner in the spherical bearing 18. The spherical portion 42 of the shoulder 40 permits free movement of the shaft 30 relative to the support rods 20.

It will be noted that a special feature of this invention is the fact that the crown receiving this radial cut will not be perforated due to the stopping action of the base of slot 60 in the guide member 22 upon the cutting tool.

The transverse cut 64 in the crown 58 is made by first loosening the screw 24 so that the guide member 22 is supported solely by the collar 26 and is free to pivot about the longitudinal axis of the support member 14. With the burr 52 at its innermost position the shaft 30 is then pivoted on the spherical bearing 18 and slightly moved arcuately about the longitudinal axis of the support member 14 in a direction transverse to the radial cut 62. Since the guide member 22 is loose on the support member 14 and rests on the collar 26 it too pivots slightly. It should be noted that the transverse slot 64 is slightly arcuate but since the entire length of the transverse slot 64 is relatively short the curvature is not objectionable.

Having thus disclosed the best embodiment of the invention presently contemplated, it it is to be understood that various changes and modifications may be made by those skilled in the art without departing from the spirit of the invention.

What I claim as new and desire to secure by Letters Patent is:

1. A dental tool guide used for cutting a T-shaped slot in a tooth crown, said guide comprising:
   (a) a support member;
   (b) a shaft including means for receiving a drivable dental tool;
   (c) means for coupling said shaft through said support member;
   (d) bearing means for journalling said shaft on said support member for pivotal movement in at least two directions which are perpendicular to each other and to the longitudinal axis of said shaft;
   (e) guide means pivotally mounted on said support member;
   (f) means for selectively preventing pivotal movement of said guide means; and
   (g) a slot in said guide means for receiving said tool and for limiting movement thereof to a direction that is parallel to one of the directions of movement to said shaft when pivotal movement of said guide means is prevented whereby the dental tool is adapted to make a radial pass through said slot and a tooth crown, the portion of said slot closest to said shaft defining means for limiting the radially inward movement of the dental tool, said guide means being pivotally movable when said tool is at the radially innermost position for permitting the dental tool to make a pass transverse to that of the radial pass.

2. The apparatus in accordance with claim 1 wherein said coupling means comprises a pair of rods extending outwardly from said support member and a spherical shoulder secured to said shaft, said spherical shoulder being seated on said rods with said shaft extending therebetween.

3. The apparatus in accordance with claim 1 wherein said bearing means is a spherical bearing.

4. The apparatus in accordance with claim 1 further including means to adjust the axial position of said guide member on said shaft.

5. The apparatus in accordance with claim 1 further including spring means axially biasing said shaft with respect to said support member.

6. The apparatus in accordance with claim 1 further including means to axially vary the length of said shaft.

7. The apparatus in accordance with claim 1 further including spaced apart stop means integral with said shaft and arranged to limit axial movement of said shaft.

References Cited

UNITED STATES PATENTS

| | | | |
|---|---|---|---|
| 1,928,518 | 9/1933 | Watson | 32—1 |
| 2,073,704 | 3/1937 | Mitchell | 32—26UX |
| 2,801,469 | 8/1957 | Sollé | 32—25 |
| 3,231,977 | 1/1966 | Harris | 32—67 |
| 3,344,842 | 10/1967 | Cameron | 32—5X |

ROBERT PESHOCK, Primary Examiner